April 25, 1939.        C. J. BRUKNER        2,156,110

FLUSH COVER ACCESS OPENING

Filed Sept. 11, 1935

INVENTOR
CLAYTON J. BRUKNER.
BY James M. Clark
ATTORNEY

Patented Apr. 25, 1939

2,156,110

UNITED STATES PATENT OFFICE 2,156,110

FLUSH COVER ACCESS OPENING

Clayton J. Brukner, Troy, Ohio, assignor to Waco Aircraft Company, a corporation of Ohio Application September 11, 1935, Serial No. 40,024

9 Claims. (Cl. 244—129)

This invention relates to access and inspection openings in relatively thin material and flush removable covers for the same.

It is an object of this invention to provide an opening in a skin material, such as the fabric covering of an airplane, wherein the skin material alone supports a frame against which a cover may be removably held such that the outer surfaces of both the skin material and cover are perfectly flush and continuous.

It is also an object to provide a frame for an opening in a fabric covering which can be applied to the covering in one simple operation whereby the fabric is clinched between two frame members. It is also an object of this invention to provide a frame in a flexible fabric covering without the necessity of first cutting an opening in the fabric. It is a further object to provide a frame for elliptical and similar openings in fabric materials which can be installed from one side of the material only.

It is also an object of this invention to provide a frame for a fabric covering which reinforces the fabric and does not require puncturing of the fabric for fastening devices such as stitches or rivets with their tendency to tear the covering when the latter is stretched or becomes taut or stressed.

It is a further object to provide a cover and frame for an access opening in the skin surface of an aircraft such that the covered opening is continuous and perfectly flush and free from aerodynamic resistance and in which the cover may be installed or removed without disturbing the frame or fabric.

A further object resides in the provision of a frame member for an opening of this type which has a curved outer portion against which the fabric is supported in tangential relationship thereby avoiding wearing or cutting of the fabric due to flapping, vibrations or change in shape. It is also an object to have the curved portion give the frame stiffness and resistance to bending in substantially all directions in which forces may normally be applied while being at the same time light in weight. It is a further object to have the clinching member in such a frame serve also as a seat for the cover.

Other no less important objects will appear from a reading of the subjoined specification and claims and from an examination of the drawing forming a part hereof, it being understood that the embodiment of the invention shown and described herein is by way of example only and that other forms coming within the scope of the claims are intended to be included herein.

In the accompanying drawing in which like characters of reference indicate corresponding parts in all the views.

Figures 1, 2, 3:
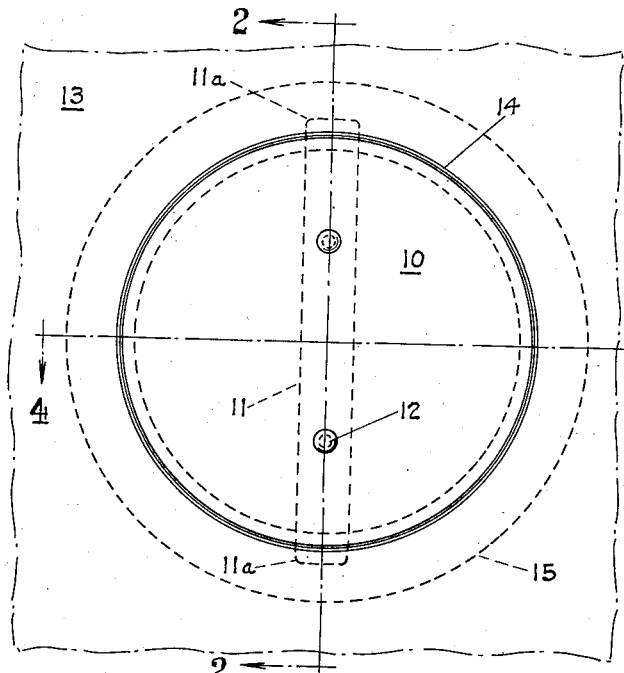
Fig. 1 is an elevation of a preferred embodiment of my invention as seen from the outside of the skin surface.
Fig. 2 is a cross-sectional elevation taken along the lines 2—2 of Fig. 1.
Fig. 3 is a similar cross-sectional elevation in which the cover is shown partially removed from the frame.

Referring to Figs. 1 and 2, 10 indicates a cover, in this case circular in outline and preferably cut or stamped from a thin sheet of metal such as aluminum or one of its alloys. A strip of spring steel 11 having end portions bent S-shaped as at 11a in Fig. 3, has a straight flat intermediate portion which is permanently fastened to the back of the cover 10 as by the rivets 12 which are positioned substantially where the bent portions 11a become tangent to the straight portions of the spring. The curved projecting spring portions 11a have a nose or bearing portion 11b which assume positions tangent to the plate 10 near its periphery when the spring is unflexed, and when flexed or bent away from the cover the spring tends to pinch or grip anything which may be interposed between the cover 10 and its nose portion 11b. The corners of the spring ends are preferably rounded to prevent injury to either the fabric or the user.

Figure 5:
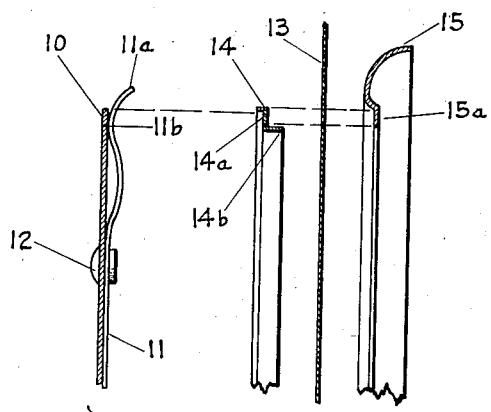
Fig. 5 shows an enlarged cross-sectional view of the cover and frame members before assembly.

The frame for the opening comprises two members, an inner frame member 15 and an outer clinching or retaining member 14. Fig. 5 shows the frame and relative positioning of these members before being attached to the covering material 13. The frame member 15 is a substantially ring-shaped flange or collar having an arcuately curved outer portion and an inwardly extending radial tongue portion 15a. The outer curved portion forms a nosing which bears tangentially against the fabric 13 when the latter is clinched about the tongue portion, and over such a large well-rounded area that cutting or damage of the fabric is practically eliminated. This is particularly desirable when the fabric is subjected to flutter or vibration caused by flight or other conditions, or where the opening is provided through a fabric covering which does not form a plane surface.

The clinching or outer frame member 14 is a ring having a substantially Z-shaped cross-section preferably formed from a thin sheet of ductile material such as aluminum. The Z-shaped cross-section before the clinching operation comprises inner and outer cylindrical flanges connected by a radially extended web portion, which, together with the small outer flange, forms a seat or recessed portion into which the disc cover 10 is adapted to fit.

When the fabric 13 is a flexible material having resilient qualities, it will stretch sufficiently during the clinching operation to obviate the necessity for first cutting the opening therethrough as would be required when less elastic materials are used. In either case, the clinching operation is substantially the same. The frame members 14 and 15 are positioned on their respective sides of the covering material, and entered one in the other, into their alined or clinching position and clinched by a short rapid stroke of suitable clinching tools in a power press, or by a somewhat slower stroke of these clinching tools by means of hand power through screw, toggle or cam action. The frame can be clinched to the covering material either before or after the covering is applied to the wing or fuselage frame to suit any particular assembly requirement.

During the clinching operation, it will be noted that the back of the web portion 14a of the clinching liner 14 pinches the fabric 13 against the tongue portion 15a of the inner frame 15. The tool then clinches or bends the inwardly extending flanged portion 14b of the clinching liner carrying the flexible fabric about the tongue 15a and clinching the fabric securely about the tongue portion and between the clinching portions 14a and 14b. This operation can be accomplished without the necessity of cutting an opening through the fabric 13 when access can be had to both sides of the fabric. This is a distinct advantage in cases where the fabric is to be doped or sprayed, as the fabric within the frame serves to protect surfaces within the covering material from being painted or marred. After the painting of the surfaces, the opening in the fabric can very readily be cut using the inner edge of the clinching liner as a guide, this portion of the frame being sufficiently reinforced, due to several thicknesses of sheet metal, to prevent workmen from distorting the same while reaching through the opening with hands or tools.

In operation, the cover 10 is secured to the frame by forcing one of the spring ends 11a about the frame member as shown at the lower portion of Fig. 3. The cover 10 and its attached spring is shown pushed sufficiently beyond its normal central position to permit the opposite spring end to be inserted within the opening frame formed by the clinching liner 14. The cover is then brought back to its central position where it will snap into place in the seat 14a provided for it and the portions 11b of the springs will bear against the flared or outturned portions 14b of the clinching member.

In order to remove the cover, it is merely necessary to push the same either by hand or by the application of a tool such as a screw driver applied against the projecting rivet heads to a position where a spring end will pass through the opening at the same time as the cover is lifted slightly from its seat in order to be moved beyond the small outer flange of the member 14. The projecting rivet heads which aid in positioning and removing the cover add but a negligible amount to the aerodynamic resistance of the cover unit, but obviously where conditions would require it, they could be countersunk absolutely flush with the outer surface of the cover which could be removed by prying the same from its seat in the member 14 by some pointed tool such as a knife or screw driver.

Figure 4:
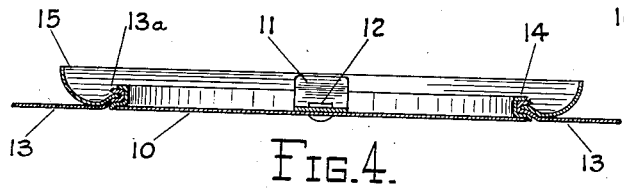
Fig. 4 is a cross-sectional plan taken along the lines 4—4 of Fig. 1.
Figure 7:
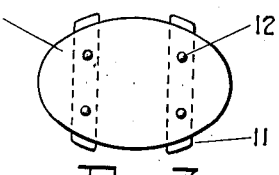
Figs. 6 and 7 show modified forms of covers and their attachment springs.

While I have shown and described circular covers, the invention is by no means limited thereto. In Fig. 7 an elliptical cover 10a is shown which would be fitted into an elliptical frame composed of members having substantially the same cross-sections as shown in Fig. 5. Elliptical frames and other shapes having greater length than width have the advantage in that they can be applied to the covering from one side of the covering only. This makes it possible to install an access opening through a fuselage wall or a wing surface after the airplane cloth has been applied and where access can be had from the exterior of the body only. In applications of this type, the fabric would necessarily be split through the opening through which the frame member and the mating clinch tool can be inserted and then rotated through 90° to their proper operating positions and the clinching operation accomplished, after which the tool member is again rotated 90° and tipped up for removal through the newly framed opening. Due to recent developments in lathes capable of machining elliptical shapes both accurately and inexpensively, the costs of dies used for punching, framing and clinching devices of this nature have been greatly reduced.

Figure 6:
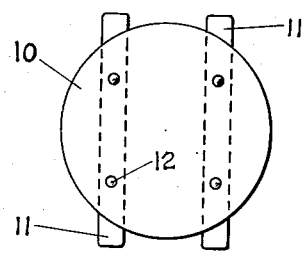

In places where the cover may be either large in area or subjected to excessive aerodynamic suction, two or more springs 11 can be provided for the additional securement required, as indicated in the small scale views of the covers shown in Figs. 6 and 7. In other modifications the covers may be releasably held by positive sliding or turning latches of any suitable type.

In aircraft construction such openings may be for purposes of inspection, servicing or adjustment of otherwise inaccessible parts within the fuselage or wings. Where inspection facilities are desired without the requirement of first removing the cover for that purpose, the cover may be made of a transparent material such as glass or Celluloid and fastened by the same or other suitable means. Such transparent covers may equally serve as vents or ports for observation purposes from the interior or to provide light for darkened portions thereof.

In the past, much of the design of certain details of aircraft construction has been dictated, and their cost greatly increased, in order to project service and adjustment details to, or through the covering material where they would be readily accessible. The servicing or complete removal of such devices can be readily accomplished by provision of such access openings as are described herein without the aerodynamic drag and resistance inherent in the prior devices.

In places where the projection of wires, struts, controls, and the like are required to be passed through the covering surface, they can readily be installed within such openings as I have described and their junction with the aircraft body surface faired into covers which may be formed in two halves to facilitate assembling and provided with suitably moulded sleeves or guide portions to enclose the said wire or control.

It is to be understood that the drawing and the above description are for purposes of illustration only, and various changes and modifications which may occur to one skilled in the art are to be considered within the scope and spirit of this invention.

What I claim is:

1. In an access opening in a covering material, a member having a rounded outer portion and an inner radial tongue portion, the outer portion extending beyond the plane of the inner tongue portion to a predetermined extent, a clinching member having a flanged portion adapted to be clinched about the tongue portion of the first said member and to securely fasten the covering material therebetween, the said covering material being in substantially tangential touching relationship with the rounded portion of said first member, the said predetermined extension of said rounded portion being substantially equal to the sum of the thicknesses of the said material and clinching member such that both said members lie entirely on one side of the original extended plane of the said covering material.

2. In an access opening in a covering material, a member having a rounded outer portion and an inner radial tongue portion, a clinching member having a flanged portion adapted to be clinched about the tongue portion of the first said member and to securely fasten the covering material therebetween, the said clinching member having a recessed seat, and a releasable cover member adapted to engage the seat of said clinching member and form a closure for said opening, such that the outside of said cover and the outermost portion of said clinching member are substantially flush and continuous with the outside of the said covering material.

3. In an access opening in a covering material, a member having a rounded outer portion and an inner radial tongue portion, a clinching member having a flanged portion adapted to be clinched about the tongue portion of the first said member and to securely fasten the covering material therebetween, the said clinching member having a recessed seat, and a cover member adapted to engage the seat of said clinching member and form a closure for said opening, the said cover member having attachment means whereby it is releasably held in engagement with said seat, such that the outside of said cover and the outermost edge of said clinching member are substantially flush and continuous with the outer surface of the said covering material.

4. In an access opening in an aircraft surface material comprising a frame member, a clinching member adapted to be applied to the material from the side opposite to that from which the frame member is applied, the said frame member having a cross-sectional form consisting of an offset outer portion and an inner tongue portion, the said clinching member having an initial cross-section consisting of a web and oppositely extending inner and outer flanges, the web and inner flange being adapted to be bent to grip the material about the said frame tongue portion and form a smooth inner edge for the said access opening frame, the web and outer flange forming a recessed seat, and a cover adapted to releasably engage said seat.

5. In an access opening in an aircraft covering material, a ring member having an arcuate portion and a flat portion, a clinching member having a flanged portion adapted to be clinched about the flat portion of the first said member and to securely fasten the covering material therebetween, the said clinching member having a recessed seat, and a releasable cover member adapted to engage the seat of said clinching member and to form a closure for said opening, the arcuate portion of the first said member serving to maintain an offset relationship between the said covering material and its clinched portion whereby the outermost portion of said clinching member is substantially flush and continuous with the outside of the said cover and covering material.

6. In an access opening in an aircraft surface material comprising a frame member having substantially the shape and size of the said opening, a clinching member adapted to be applied to the material from the side exposed to the airstream and opposite to that from which the frame member is applied, the said frame member having a cross-sectional form consisting of an offset outer portion and an inner tongue portion, the said clinching member having an initial Z-shaped cross-section consisting of a web and oppositely extending inner and outer flanges, the web and inner flange being adapted to be bent to grip the material around the said frame tongue portion, the web and the outer flange forming a seat, and a cover member adapted to be releasably retained within said seat.

7. In an access opening for a covering material, a member having a radial tongue portion, the said ring member being adapted for attachment to the covering material from the inner side of the same, a clinching member having a flanged portion adapted to be clinched about the tongue portion of the first said member and to securely fasten the covering therebetween, the said clinching member being adapted for attachment from the outer side of said covering material, a recessed seat in the said clinching member, and a cover member adapted to engage the said seat and form a closure for the said opening, the said cover member having attachment means whereby it is releasably held in engagement with the said seat, such that the outside surface of said cover and the outermost edge of said clinching member are substantially flush and continuous with the outer surface of the said covering material.

8. In an access opening in an aircraft surface material comprising a frame member having substantially the shape and size of the said opening, a clinching member adapted to be applied to the opposite, or airstream, side of the material, the said frame member having a cross-sectional form consisting of an offset outer portion and an inner tongue portion, the said clinching member having an initial Z-shaped cross-section consisting of a web and oppositely extending inner and outer flanges, the web and inner flange being formed to grip the material about the said frame tongue portion and forming a finished inner edge of the said access opening frame, the web and the outer flange being adapted to form a seat, and a cover member adapted to be releasably retained within said seat such that the outer surface of the cover, the edge of the second said flange and the said material present a flush and continuous surface to the airstream.

9. The method of forming a frame for a noncircular access opening in a taut covering material applied to an aircraft framework, in which the said covering material is accessible from the outer side only comprising cutting an opening in the material, inserting a member having a rounded outer portion, and an inner radial tongue portion thru the said opening, positioning the said member against the inner side of said material, inserting a clinching tool through the opening and rotating to a position in alignment with the first said member, positioning a clinching member having a flanged portion against the outer side of said material, applying a complementary clinching tool to the said clinching member, drawing the said clinching tools together by forces exerted on the outer side of said material only, whereby the said material and flanged portion are caused to be folded and clinched around the tongue portion of the first said member to provide a recessed seat for a flush cover.

CLAYTON J. BRUKNER.